US008611086B1

(12) United States Patent
Magnusson et al.

(10) Patent No.: US 8,611,086 B1
(45) Date of Patent: Dec. 17, 2013

(54) ASSEMBLY FOR CARRYING AND PROTECTING A TABLET COMPUTER OR SIMILAR ITEM

(76) Inventors: Carl G. Magnusson, New York, NY (US); Nick Tzuyung Shen, New York, NY (US)

( * ) Notice: Subject to any disclaimer, the term of this patent is extended or adjusted under 35 U.S.C. 154(b) by 156 days.

(21) Appl. No.: 13/024,322

(22) Filed: Feb. 9, 2011

(51) Int. Cl.
*G06F 1/16* (2006.01)
*H05K 7/00* (2006.01)

(52) U.S. Cl.
USPC .................................. 361/679.59; 455/575.8

(58) Field of Classification Search
USPC ........ 361/679.55–679.56, 679.59; 455/575.8; 224/270, 578, 584, 930; 206/320; 98/679.55–679.56, 679.59
See application file for complete search history.

(56) References Cited

U.S. PATENT DOCUMENTS

| | | | | |
|---|---|---|---|---|
| 5,002,184 | A * | 3/1991 | Lloyd | 206/305 |
| 5,404,267 | A * | 4/1995 | Silva et al. | 361/679.03 |
| 5,570,267 | A * | 10/1996 | Ma | 361/679.21 |
| 5,583,742 | A * | 12/1996 | Noda et al. | 361/679.21 |
| 5,586,002 | A * | 12/1996 | Notarianni | 361/679.26 |
| 5,682,993 | A * | 11/1997 | Song | 206/320 |
| 5,887,777 | A | 3/1999 | Myles et al. | |
| 5,931,297 | A * | 8/1999 | Weill et al. | 206/320 |
| 6,163,450 | A * | 12/2000 | Kim | 361/679.27 |
| 6,201,867 | B1 * | 3/2001 | Koike | 379/433.11 |
| 6,655,540 | B2 * | 12/2003 | Shimoda et al. | 220/4.02 |
| 6,659,274 | B2 * | 12/2003 | Enners | 206/305 |
| 6,781,825 | B2 * | 8/2004 | Shih et al. | 361/679.58 |
| 6,977,809 | B2 * | 12/2005 | Bovino | 361/679.55 |
| 7,248,463 | B2 * | 7/2007 | Bander et al. | 361/679.27 |
| 7,342,778 | B2 * | 3/2008 | Fan et al. | 361/679.55 |
| 7,495,895 | B2 * | 2/2009 | Carnevali | 361/679.26 |
| D587,896 | S  * | 3/2009 | Aipa | D3/201 |
| 7,542,052 | B2 * | 6/2009 | Solomon et al. | 345/659 |
| 7,643,274 | B2 * | 1/2010 | Bekele | 361/679.02 |
| 7,886,903 | B1 * | 2/2011 | Wurzelbacher et al. | 206/320 |
| 7,907,400 | B2 * | 3/2011 | Bekele | 361/679.55 |
| 8,051,980 | B2 * | 11/2011 | Tai et al. | 206/320 |
| 8,139,348 | B2 * | 3/2012 | Ruch et al. | 361/679.21 |
| 2002/0044406 | A1 * | 4/2002 | Shimoda et al. | 361/679 |
| 2002/0065054 | A1 * | 5/2002 | Humphreys et al. | 455/90 |
| 2003/0184958 | A1 * | 10/2003 | Kao | 361/683 |
| 2004/0011616 | A1 | 1/2004 | Rasmussen | |
| 2004/0025993 | A1 * | 2/2004 | Russell | 150/154 |
| 2004/0264126 | A1 * | 12/2004 | Wells | 361/687 |
| 2005/0139498 | A1 * | 6/2005 | Goros | 206/320 |
| 2005/0161301 | A1 * | 7/2005 | Hoberman et al. | 190/110 |
| 2005/0181745 | A1 * | 8/2005 | Wood et al. | 455/90.3 |
| 2006/0060485 | A1 * | 3/2006 | Picot et al. | 206/320 |
| 2006/0226040 | A1 * | 10/2006 | Medina | 206/320 |
| 2007/0139873 | A1 * | 6/2007 | Thomas et al. | 361/681 |

(Continued)

*Primary Examiner* — Adrian S Wilson
(74) *Attorney, Agent, or Firm* — LaMorte & Associates, P.C.

(57) ABSTRACT

A carrying assembly for a tablet computer that protects the periphery of the tablet computer from impact, yet does not cover the face surface of the tablet computer. Accordingly, the tablet computer can be operated while still being bound within the carrier assembly. The carry assembly has a frame structure with four side elements, four corners and an open central region. The tablet computer is mounted to the frame structure so that the bottom of the tablet computer rests upon the side elements. At least two mounting connectors are provided, wherein one of the mounting connectors extends upwardly from each of the corners of the frame structure. The mounting connectors have locking fingers that receive and engage the corners of the tablet computer with a snap fit, therein mechanically attaching said frame structure to the tablet computer.

13 Claims, 4 Drawing Sheets

(56) References Cited

U.S. PATENT DOCUMENTS

| | | |
|---|---|---|
| 2007/0152633 A1* | 7/2007 | Lee .................... 320/114 |
| 2007/0247793 A1* | 10/2007 | Carnevali .................... 361/681 |
| 2007/0247801 A1* | 10/2007 | Bekele .................... 361/683 |
| 2008/0096620 A1* | 4/2008 | Lee et al. .................... 455/575.8 |
| 2008/0164790 A1* | 7/2008 | Tsang et al. .................... 312/223.2 |
| 2009/0114556 A1* | 5/2009 | Tai et al. .................... 206/320 |
| 2009/0219684 A1* | 9/2009 | Mori .................... 361/679.56 |
| 2010/0033911 A1* | 2/2010 | Chang et al. .................... 361/679.01 |
| 2010/0035666 A1* | 2/2010 | Chang et al. .................... 455/575.1 |
| 2011/0188176 A1* | 8/2011 | Kim .................... 361/679.01 |

* cited by examiner

ASSEMBLY FOR CARRYING AND PROTECTING A TABLET COMPUTER OR SIMILAR ITEM

BACKGROUND OF THE INVENTION

1. Field of the Invention

In general, the present invention relates to devices that are used to carry tablet computers and similarly sized items. More particularly, the present invention relates to computer bags and other carrying cases that enable a computer to be operated by a user without being removed from the carrying device.

2. Prior Art Description

Carry bags for computers have been in existence for as long as there have been portable computers.

Computer bags keep a computer safe and dry as the computer is carried from one place to another. The computer bags also help prevent a computer from being damaged if it is dropped or otherwise impacted as it is being transported.

The prior art is replete with various types and styles of computer bags that were designed to accommodate the multitude of portable computers that have been commercially marketed. Traditional computer bags are little more than luggage bags that are sized to receive a particular shape of portable computer. Such traditional computer bags typically have straps or handles that make the computer bag easier to carry. However, to access the portable computer, the computer bag must be opened and the portable computer removed from the bag.

Certain specialty prior art computer bags have been designed that enable a portable computer to be accessed within a carrying bag without being fully removed from the carry bag. Such prior art specialty bags typically have a large flap that can be turned away to expose a window to the interior of the bag and the portable computer held within. Such specialty computer bags are exemplified by U.S. Patent Application Publication No. 2004/0011616 to Rasmussen, entitled Carrying Case For A Computer and U.S. Pat. No. 5,887,777 to Myles, entitled Computer Carrying Bag.

A problem associated with most prior art computer bags is that the bag adds significantly to the bulk of the portable computer. Portable computers are becoming increasingly thinner and lightweight. This enables the computers to be stored in briefcases, folders and backpacks with other paperwork. This is an important marketing feature of modern portable computers. The use of old-fashioned computer bags to hold a modern ultra-thin portable computer makes no sense on a marketing level. People who are attracted to thin lightweight computers would typically mot be interested in carrying that computer around in a heavy bulky bag. Rather, many people who own thin portable computers often do not store that computer in any kind of computer bag. Rather, the computer is merely carried as a book or placed in a school bag or briefcase with paperwork. Since thin, lightweight computers are typically not carried in protective bags, they are highly vulnerable to damage, especially impact damage from being dropped.

Although modern computers are very thin and lightweight and easy to carry, they do need some protection from impact. This is especially true around the edges of the computer. Furthermore, modern portable computers need some type of carrier with a handle or strapping that decreases the likelihood that the computer will be dropped when it is transported from place to place. However, such protection must be provided in a manner that does not increase the bulkiness of the computer or in a manner that inhibits instant access to the computer.

A need therefore exists for a carrying system for a modern thin portable computer that does not add any significant bulk to the computer, protects the computer and does not inhibit access to the portable computer. These needs are met by the present invention as described and claimed below.

SUMMARY OF THE INVENTION

The present invention is a carrying assembly for a tablet computer. The carrying assembly protects the periphery of the tablet computer from impact, yet does not cover the face surface of the tablet computer. Accordingly, the tablet computer can be operated while still being bound within the carrier assembly.

The carry assembly has a frame structure with four side elements, four corners and an open central region. Each side element has an inside edge that faces said open central region and an outside edge that faces away from the open central region. The tablet computer is mounted to the frame structure so that the bottom of the tablet computer rests upon the side elements.

At least two mounting connectors are provided at opposite sides of the frame structure. The mounting connectors extends upwardly from two or more of the corners of the frame structure. The mounting connectors have locking fingers that receive and engage the corners of the tablet computer with a snap fit, therein mechanically attaching said frame structure to the tablet computer.

A carry strap is attached to the frame structure. As such, the attachment of the carry assembly to a tablet computer provides strapping that enables the tablet computer to be more securely carried.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention carrying assembly can be embodied in many ways, the embodiment illustrated shows the assembly being used to hold a tablet computer. This embodiment is selected in order to set forth the best mode contemplated for the invention. The illustrated embodiment, however, is merely exemplary and should not be considered a limitation when interpreting the scope of the appended claims.

Figure 1:
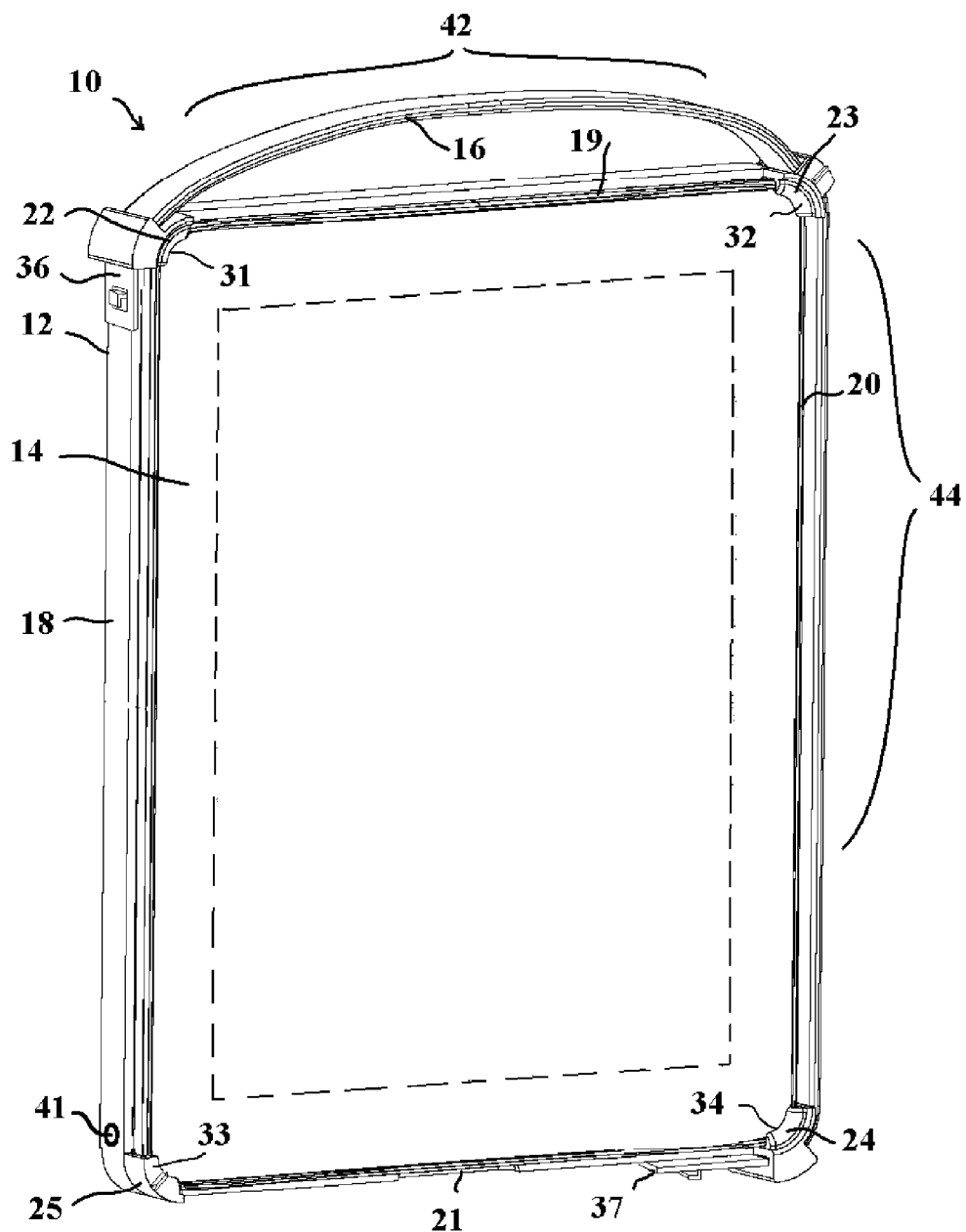
FIG. 1 is a perspective view of an exemplary embodiment of the present invention carrying assembly shown carrying a tablet computer.
Figure 2:
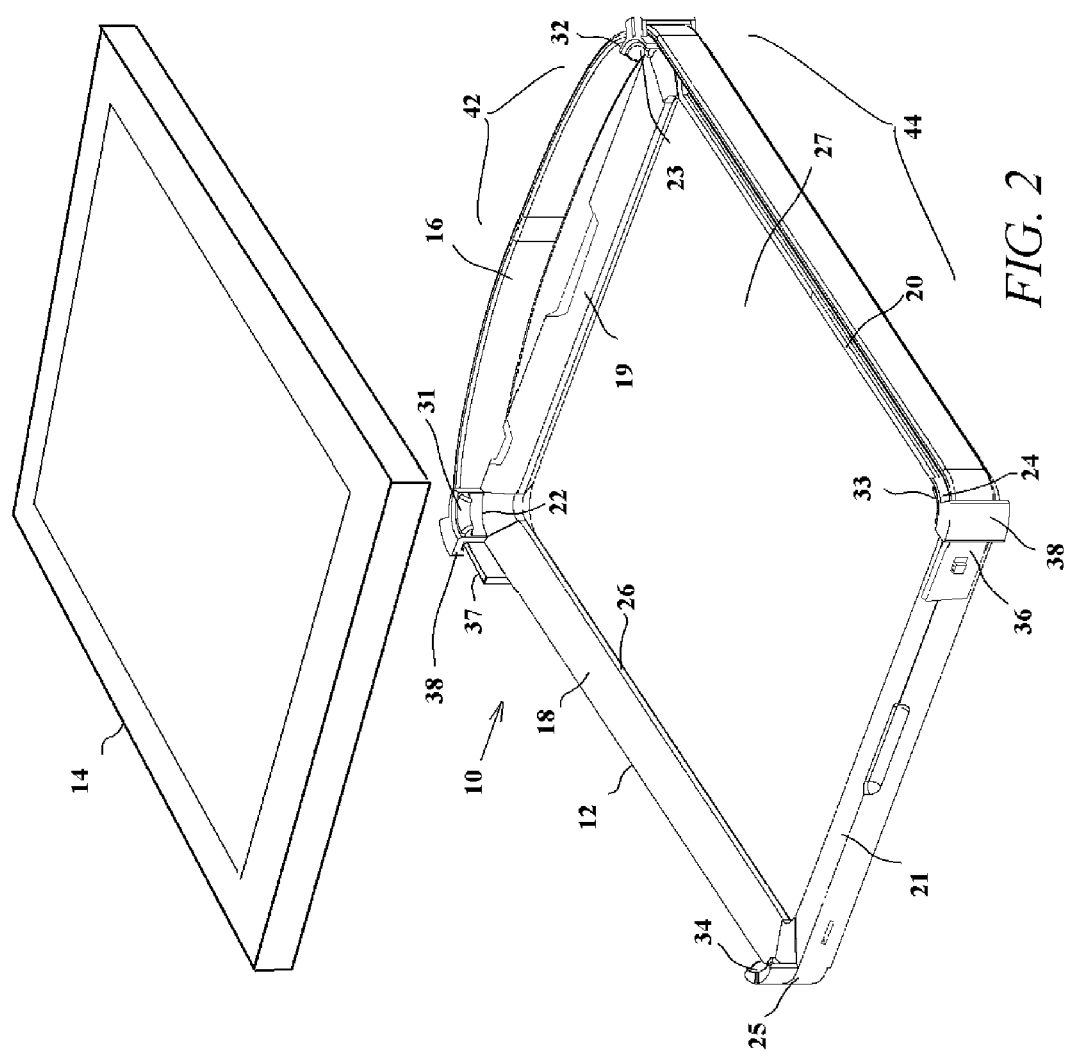
FIG. 2 is an exploded view of the embodiment of FIG. 1.
Figure 3:
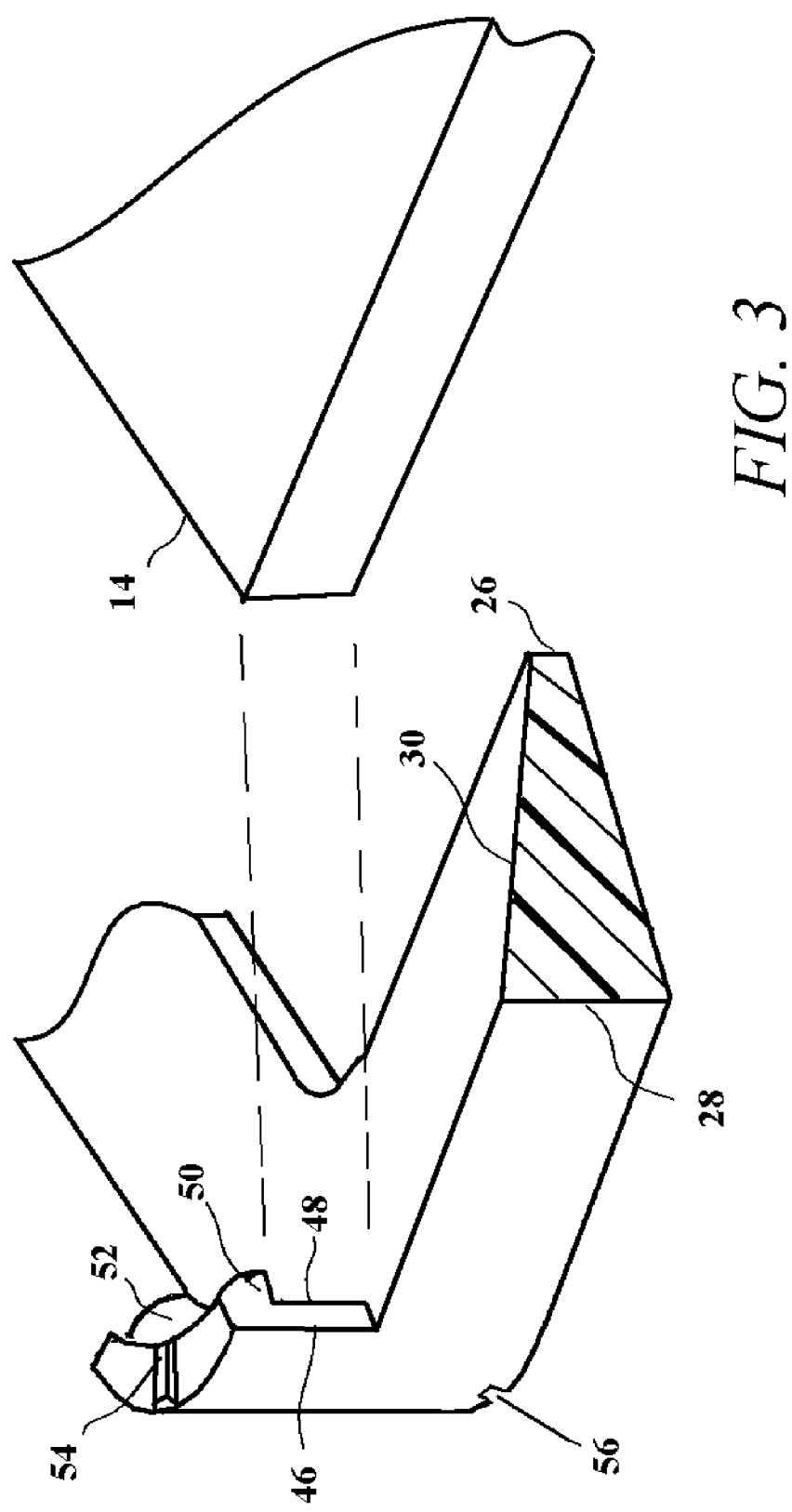
FIG. 3 is a cross-sectional view of a corner of the carrying assembly.

Referring to FIG. 1 in conjunction with FIG. 2 and FIG. 3, a carrying assembly 10 is shown. The carrying assembly 10 includes a peripheral frame structure 12. The peripheral frame structure 12 mounts to the tablet computer 14 and protects the periphery of a tablet computer 14. Strapping 16 is coupled to the peripheral frame structure 12. In this manner, when the peripheral frame structure 12 is connected to the tablet computer 14, the tablet computer 14 can be transported by grasping and lifting the strapping 16. Furthermore, since the peripheral frame structure 12 surrounds the periphery of the tablet computer 14, the peripheral frame structure 12 protects the edges of the tablet computer 14 from impact damage.

The peripheral frame structure 12 has four straight side elements 18, 19, 20, 21 that interconnect at four corners 22, 23, 24, 25 to create a square or rectangular frame that surrounds an open internal area 27. Each of the straight side elements 18, 19, 20, 21 has an inside edge 26 and an outside edge 28. The distance between the inside edge 26 and the outside edge 28 is preferably between one and three centimeters. Furthermore, the outside edge 28 of each straight side element 18, 19, 20, 21 is much thicker than that of the inside edge 26. Accordingly, the straight side elements 18, 19, 20, 21 present sloped top surfaces 30 that slope from the outside edge 28 down toward the inside edge 26.

The peripheral frame structure 12 is preferably made of an elastomeric material, such as a synthetic rubber, that can be manually manipulated without damage and which can absorb the energy of impacts. The peripheral frame structure 12 is preferably unistructurally molded from the elastomeric material. However, other manufacturing techniques can be used.

Four snap-fit connectors 31, 32, 33, 34 are illustrated. The snap-fit connectors 31, 32, 33, 34 can be molded with the peripheral frame structure 12 or can be added to the peripheral frame structure 12 in a secondary operation. For the illustrated embodiment, one of the snap-fit connectors 31, 32, 33, 34 is positioned in each of the four corners 22, 23, 24, 25 of the peripheral frame structure 12. The snap-fit connectors 31, 32, 33, 34 serve three primary functions. First, as will be later explained, the snap-fit connectors 31, 32, 33, 34 engage the tablet computer 14 and mechanically mount the tablet computer 14 to the peripheral frame structure 12. Second, the snap-fit connectors 31, 32, 33, 34, as will later be explained, serve as stacking legs so that multiple carrying assemblies 10 can be mounted atop each other. Lastly, some of the snap-fit connectors 31, 32, 33 lay adjacent strap anchors 35 that serve as mounting points for the strapping 16.

The strapping 16 that is provided has two free ends 36, 37. Of the four snap-fit connectors 31, 32, 33, 34, two are disposed next to strap anchors 35. The snap-fit connectors 31, 33 next to the strap anchors 35 are mounted at opposing diagonal corners 22, 24 of the peripheral frame structure 12. The snap-fit connector 32 with a strap loop 40 is interposed at the corner 23 between the opposing diagonal corners 22, 24. The strapping 16 is threaded through the strap loop 40 of the central snap fit connector 32. The two free ends 36, 37 of the strapping 16 are then anchored to the strap anchors 35. This creates two looped areas 42, 44 of the strapping 16. The two looped areas 42, 44 of strapping 16 run along adjacent sides of the peripheral frame structure 12. Consequently, the peripheral frame structure 12 and the tablet computer 14 it supports can be held in two orientations by strapping.

In the shown embodiment, the strapping 16 is a single piece. It should be understood that the strapping 16 can be made of two pieces so that the length of the strapping 16 can be selectively adjusted by a user.

One or more security cable ports 41 can be provided so that the frame structure 12 can be anchored to a security cable if desired.

Referring to FIG. 3 in conjunction with FIG. 2, it can be seen that for the illustrated embodiment, each snap-fit connector 31, 32, 33, 34 has an extending locking finger 46. However, it should be understood that a locking finger 46 can extend from only three or two of the snap-fit connectors. Only two locking fingers 46 are required to retain a tablet computer 14. In the illustrated, four locking fingers 46 are used to provided maximum interconnection between the tablet computer b14 and the peripheral frame structure 12.

Each locking finger 46 has a vertical section 48 and a locking protrusion 50 that extends inwardly from the vertical section 48. The distance between the bottom of the locking protrusion 50 and the bottom of the vertical section 48 is equal to the thickness of the tablet computer 14. Consequently, the corners of the tablet computer 14 fit under the locking protrusions 50 and become locked in place. The top surface 52 of the locking protrusion 50 is sloped. This helps guide the tablet computer 14 to its proper locking position as a tablet computer 14 is placed atop the snap fit connectors 31, 32, 33, 34 and is pressed down to snap in place under the locking protrusions 50.

When the tablet computer 14 is locked in place, the underlying surface 30 of the side elements 18, 19, 20, 21 slope away from the tablet computer 14. This prevents the peripheral frame structure 12 from contacting any switches, buttons or controls that may be designed into the tablet computer 14. Furthermore, since the table computer 14 is only engaged at its corners, the sides of the tablet computer 14 are left unobstructed by the carrying assembly 10. For certain tablet computers openings and reliefs 38 can be formed in the peripheral frame structure 12 to accommodate various computer switches, controls, and ports. A person will therefore have open access to any connection ports on the tablet computer 14, such as a power cord connection port or USB connection port.

Figure 4:
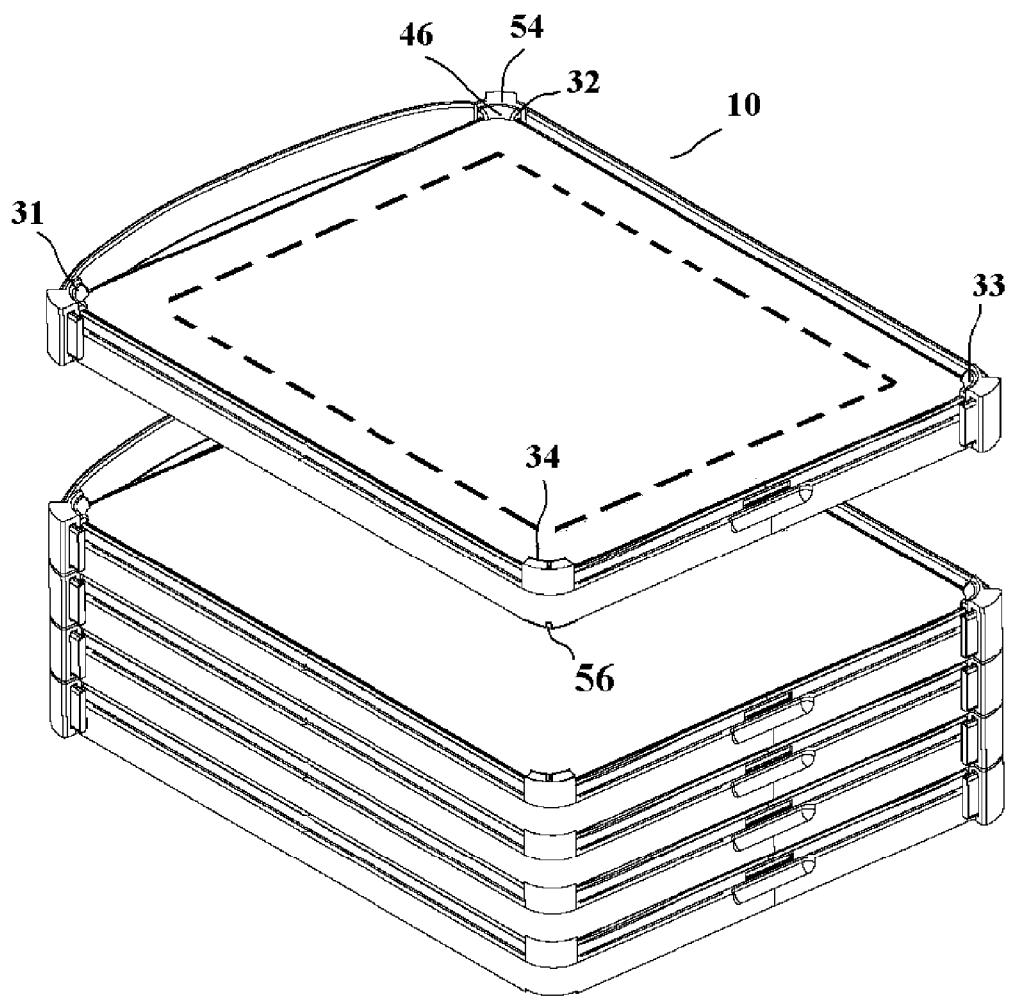
FIG. 4 is a perspective view of a plurality of carrying assemblies piled in a stack.

Referring to FIG. 4, in conjunction with FIG. 3, it can be seen that each vertical section 48 of the locking fingers 46 has a top end 54. Furthermore, a depression 56 is formed on the bottom of each snap-fit connector 31, 32, 33, 34. The depression is sized to receive the top end 54 of the vertical section 48 of a locking finger 46. In this manner, if more than one tablet computer 14 is provided and more than one carrying assembly 10 is used to retain those computers, the carrying assemblies 10 can be neatly and uniformly stacked. Large neat piles of tablet computers can therefore be created in classrooms or other such institutions.

It will be understood that the embodiment of the present invention that are illustrated and described are merely exemplary and that a person skilled in the art can make many variations to that embodiment. For instance, the length and width of the peripheral frame structure can be varied to match the exterior dimensions of different tablet computers. Furthermore, more than four snap fit connectors can be used and those snap fit connectors can be positioned at places other then at the corners. All such embodiments are intended to be included within the scope of the present invention as defined by the claims.

What is claimed is:

1. A carrier assembly for a tablet computer, comprising;
a frame structure having four side elements, and four corners that include a first corner, a second corner, a third corner and a fourth corner, wherein said four side elements and said four corners define a periphery around an open central region that extends through said frame structure, wherein said first corner and said third corner are positioned at diagonally opposed positions along said periphery and said second corner is interposed between said first corner and said third corner along said periphery, and wherein each of said side elements has an inside edge that faces said open central region and an outside edge that faces away from said open central region;
a strap running along said periphery between said first corner and said third corner, wherein said strap is anchored to said first corner, anchored to said third corner and guided by said second corner, therein forming a first loop structure between said first corner and said second corner, and a second loop structure between said second corner and said third corner; and four mounting connectors, wherein one of said mounting connectors extends upwardly from each of said corners of said frame structure, wherein said mounting connectors are sized to receive and engage the tablet computer, therein mechanically attaching said frame structure to the tablet computer.

2. The assembly according to claim 1, wherein said strap has two free ends and wherein said free ends are anchored to said frame structure at at said first corner and at said third corner.

3. The assembly according to claim 2, wherein a strap guide is formed at said second corner.

4. The assembly according to claim 3, wherein said strap extends through said strap guide.

5. The assembly according to claim 1, wherein said outside edge of each of said straight side elements is wider than said inside edge, therein producing a sloped surface.

6. The assembly according to claim 1, wherein said frame structure is unistructurally molded from an elastomeric material.

7. The assembly according to claim 1, wherein each of said mounting connectors is a snap-fit connector having a locking finger that snaps in place over an edge of the tablet computer, therein locking the tablet computer into place.

8. An assembly, comprising;
a tablet computer having a face surface;
a frame structure having four side elements, and four corners that include a first corner, a second corner, a third corner and a fourth corner, wherein said four side elements and said four corners define a periphery around an open central region that extends through said frame structure, wherein said first corner and said third corner are positioned at diagonally opposed positions along said periphery and said second corner is interposed between said first corner and said third corner along said periphery, wherein each of said side elements has an inside edge that faces said central region, an outside edge that faces away from said central region, and a sloped top surface that slopes from said outside edge down toward said inside edge; and a plurality of locking fingers extending upwardly from said frame structure, wherein said locking fingers have protrusions that pass over said face surface of said tablet computer, therein locking said tablet computer between said protrusions and said sloped top surface of said frame structure.

9. The assembly according to claim 8,
further including a strap, wherein said strap runs along at least some of said periphery of said frame structure.

10. The assembly according to claim 9, wherein said strap has two free ends and wherein said free ends are anchored to said frame structure at said first corner and said third corner, respectively.

11. The assembly according to claim 10, wherein a strap guide is formed in said second corner.

12. The assembly according to claim 11, wherein said strap extends through said strap guide.

13. The assembly according to claim 8, wherein said outside edge of each of said straight side elements is wider than said inside edge, therein producing said sloped top surface.

\* \* \* \* \*